(12) United States Patent
Zou

(10) Patent No.: US 12,527,430 B2
(45) Date of Patent: Jan. 20, 2026

(54) MULTI-CHAMBER OVEN

(71) Applicant: GUANGDONG YUELAI YUEMEI HOME APPLIANCE TECHNOLOGY CO., LTD., Foshan (CN)

(72) Inventor: Hong Zou, Foshan (CN)

(73) Assignee: GUANGDONG YUELAI YUEMEI HOME APPLIANCE TECHNOLOGY CO., LTD., Foshan (CN)

(*) Notice: Subject to any disclaimer, the term of this patent is extended or adjusted under 35 U.S.C. 154(b) by 727 days.

(21) Appl. No.: 17/946,275

(22) Filed: Sep. 16, 2022

(65) Prior Publication Data

US 2023/0414037 A1 Dec. 28, 2023

Related U.S. Application Data

(63) Continuation of application No. PCT/CN2022/113667, filed on Aug. 19, 2022.

(30) Foreign Application Priority Data

Jun. 23, 2022 (CN) .......................... 202221591067.3

(51) Int. Cl.
*A47J 37/06* (2006.01)
*F24C 15/00* (2006.01)
*F24C 15/32* (2006.01)

(52) U.S. Cl.
CPC ....... *A47J 37/0641* (2013.01); *A47J 37/0664* (2013.01); *F24C 15/006* (2013.01);
(Continued)

(58) Field of Classification Search
CPC .... F24C 15/007; F24C 15/006; F24C 15/008; F24C 15/322; F24C 15/325; A47J 37/0641; A47J 37/0664
See application file for complete search history.

(56) References Cited

U.S. PATENT DOCUMENTS 5,485,780 A * 1/1996 Koether .................. F24C 15/16
219/400
2022/0163212 A1* 5/2022 Mitrik ................. A47J 37/0676

FOREIGN PATENT DOCUMENTS

CN          203987693 U     12/2014
CN          209984057 U  *  1/2020
(Continued)

OTHER PUBLICATIONS

International Search Report and Written Opinion issued in corresponding PCT Application No. PCT/CN2022/113667, dated Dec. 28, 2022.

*Primary Examiner* — Elizabeth L McKane
(74) *Attorney, Agent, or Firm* — Westbridge IP LLC

(57) ABSTRACT

Disclosed is a multi-chamber oven, including a box body, a baffle assembly, a heating assembly, a hot air circulation system and an overturn assembly. The box body includes an outer shell and an inner shell. The inner shell is formed with an inner cavity. The baffle assembly is movably mounted in the inner cavity to divide the inner cavity into a first cavity and a second cavity. The heating assembly is provided on cavity walls of the first cavity and the second cavity, to bake food material placed in the first cavity and the second cavity. The hot air circulation system is communicated with the first cavity and the second cavity, to bake food material placed in the first cavity and the second cavity. The overturn assembly is movably provided on a side wall of the inner cavity to drive the food material in the inner cavity to turn over.

9 Claims, 8 Drawing Sheets

(52) U.S. Cl.
CPC .......... *F24C 15/007* (2013.01); *F24C 15/008* (2013.01); *F24C 15/322* (2013.01)

(56) References Cited

FOREIGN PATENT DOCUMENTS

| | | | |
|---|---|---|---|
| CN | 112244662 A | | 1/2021 |
| CN | 213309176 U | | 6/2021 |
| CN | 214017181 U | * | 8/2021 |
| CN | 214804209 U | | 11/2021 |
| CN | 215077720 U | | 12/2021 |
| CN | 216135707 U | | 3/2022 |
| CN | 216147861 U | | 4/2022 |

* cited by examiner

MULTI-CHAMBER OVEN

CROSS-REFERENCE TO RELATED APPLICATIONS

This application is a continuation application of International Application No. PCT/CN2022/113667, filed on Aug. 19, 2022, which claims priority to Chinese Patent Application No. 202221591067.3, filed on Jun. 23, 2022. The disclosures of the above-mentioned applications are incorporated herein by reference in their entireties.

TECHNICAL FIELD

The present disclosure relates to the technical field of ovens, in particular to a multi-chamber oven.

BACKGROUND

The oven is one of the cooking equipment that people often use at present. Through the multi-chamber oven, the food can be quickly fried, which is simple and convenient. The function of the oven in the existing solution is relatively simple, and the method for processing food through the oven is relatively limited, which cannot well meet the functions required by consumers, resulting in a low user experience.

SUMMARY

The main objective of the present disclosure is to provide a multi-chamber oven, which aims to expand the function of the air fryer by adding a hot air circulation system, and expand the function of the oven by adding an overturn assembly. The heating assembly, the hot air circulation system and the overturn assembly are reasonably combined, which effectively takes into account the functional advantages of the three, thereby meeting the different needs of users, improving user experience, and effectively saving kitchen space.

In order to achieve the above objective, the present disclosure provides a multi-chamber oven, including:
- a box body including an outer shell and an inner shell connected to the outer shell, the outer shell is enclosed with the inner shell to form a storage cavity, the inner shell is formed with an inner cavity, and the storage cavity is communicated with the inner cavity;
- a baffle assembly movably mounted in the inner cavity to divide the inner cavity into a first cavity and a second cavity;
- a heating assembly provided on a cavity wall of the first cavity and a cavity wall of the second cavity, to bake a food material placed in the first cavity and the second cavity;
- a hot air circulation system provided in the storage cavity and communicated with the first cavity and the second cavity, to bake the food material placed in the first cavity and the second cavity; and
- an overturn assembly movably provided on a side wall of the inner cavity to drive the food material in the inner cavity to turn over, to make the heating assembly and the hot air circulation system bake the turned food material.

In an embodiment, the inner shell includes a top plate, a furnace lamp is mounted on a surface of the top plate facing the inner cavity, a groove is formed at an end of the baffle assembly close to the furnace lamp, and the furnace lamp is clamped in the groove, to make the furnace lamp illuminate the first cavity and the second cavity simultaneously.

In an embodiment, a bottom wall of the inner cavity is connected to a guide rail assembly, the guide rail assembly includes a first guide rail and a second guide rail, the first guide rail is mounted on the top plate, and the second guide rail is provided on the bottom wall of the inner cavity; an insertion groove is formed on one side of the baffle assembly, another side of the baffle assembly is an abutting end, and the abutting end is communicated with the groove; and the first guide rail is U-shaped, and is slidably matched with the abutting end, the second guide rail is formed with a protrusion on a surface facing the baffle assembly, and the protrusion is slidably matched with the insertion groove, to make the baffle assembly be slidably provided on the guide rail assembly.

In an embodiment, the multi-chamber oven further includes: a micro switch assembly including a mounting seat and a micro switch provided on the mounting seat; and a control panel mounted in the storage cavity. The mounting seat is mounted on a top wall of the inner cavity and is located at one side of the first guide rail; the first guide rail is provided with a through hole for the micro switch to pass through, to make the micro switch sense the installation of the baffle assembly; and the control panel is located at one side of an opening of the inner cavity, and the micro switch is electrically connected to the control panel.

In an embodiment, the storage cavity is provided with a pressing plate, and the pressing plate is provided on a side of the control panel facing the storage cavity; the pressing plate is provided with a thermal insulation cotton, and the thermal insulation cotton is configured to insulate heat of the inner cavity; and/or the baffle assembly includes a first thermal insulation plate and a second thermal insulation plate that are attached and connected to each other.

In an embodiment, the overturn assembly includes: a swivel fork bracket mounted on an inner side wall of the inner cavity; a first drive member mounted on an outer side wall of the inner cavity and located in the storage cavity; and a swivel fork shaft. One end of the swivel fork shaft is movably mounted on the swivel fork bracket, and the other end of the swivel fork shaft is connected to an output end of the first drive member, to make the first drive member drive the swivel fork shaft to rotate.

In an embodiment, the top plate is provided with a ventilation hole, the hot air circulation system includes an outer cover and two spaced apart hot air assemblies provided on the outer cover, the outer cover is mounted on the top plate, the two hot air assemblies are located above the ventilation hole, and the two hot air assemblies are communicated with the inner cavity through the top plate.

In an embodiment, each hot air assembly includes a second drive member, a cooling blade, a convection blade, and an inner cover provided between the cooling blade and the convection blade; the second drive member includes a drive motor and an output shaft provided at an output end of the drive motor, both the cooling blade and the convection blade are sleeved on the output shaft, the convection blade is provided on a side close to the ventilation hole, and the cooling blade is provided on a side of the convection blade away from the ventilation hole; the inner cover is fixedly connected to the top plate, the convection blade is provided in the inner cover, the outer cover is wrapped around an outer periphery of the inner cover, and a cooling air duct is formed between the outer cover and the inner cover; the heating assembly includes two first heating elements opposite to each other, one of the two hot air assemblies is provided on a side of one of the two first heating elements, another one of the two hot air assemblies is provided on a side of another one of the two first heating elements; and the heating assembly further includes two second heating elements opposite to each other, and the second heating element is provided on a side of the first heating element away from the hot air assembly.

In an embodiment, the box body further includes a plurality of air inlet holes and air exhaust passages, and the plurality of air inlet holes are provided on an outer wall of the outer shell and communicated with the storage cavity; a side wall of the inner cover is provided with the ventilation hole, the cooling air duct is communicated with the ventilation hole, and the air exhaust passage is fixedly mounted on the outer wall of the outer shell and communicated with the cooling air duct; the storage cavity is also provided with a cooling assembly, the cooling assembly includes a fan base and a cooling fan provided on the fan base, the fan base is mounted on a side of the control panel and communicated with the air inlet hole; and the cooling assembly further includes an air duct baffle, the air duct baffle is provided on a side of the outer cover close to the control panel, and on a side of the air outlet of the cooling fan, so that the air flow blown by the cooling fan is concentrated on the control panel.

In an embodiment, the multi-chamber oven further includes: a door assembly; and a connecting rod assembly. The connecting rod assembly is provided on a bottom wall of the inner cavity, to make the connecting rod assembly drive the door assembly to open at an angle; the door assembly includes a first glass door and a second glass door; the connecting rod assembly includes two switch frames and a connecting piece that drives the two switch frames to rotate; one ends of the two switch frames are respectively provided on inner surfaces of the first glass door and the second glass door, and the other ends of the two switch frames are rotatably connected to the connecting piece; and the connecting piece includes a fixed base and two sliding blocks rotatably connected to the fixed base, and the two switch frames are rotatably connected to one end of the two sliding blocks away from the fixed base.

The present disclosure provides a multi-chamber oven, including: a box body, a baffle assembly, a heating assembly, a hot air circulation system and an overturn assembly. The box body includes an outer shell and an inner shell connected to the outer shell, the outer shell is enclosed with the inner shell to form a storage cavity, the inner shell is formed with an inner cavity, and the storage cavity is communicated with the inner cavity. The baffle assembly is movably mounted in the inner cavity to divide the inner cavity into a first cavity and a second cavity. The heating assembly is provided on a cavity wall of the first cavity and a cavity wall of the second cavity, to bake a food material placed in the first cavity and the second cavity. The hot air circulation system is provided in the storage cavity and communicated with the first cavity and the second cavity, to bake the food material placed in the first cavity and the second cavity. The overturn assembly is movably provided on a side wall of the inner cavity to drive the food material in the inner cavity to turn over, to make the heating assembly and the hot air circulation system bake the turned food material. The inner cavity is divided into the first cavity and the second cavity through the baffle assembly. The heating assembly and the hot air circulation system can bake the food material in the first cavity and the second cavity. The added hot air circulation system expands the function of the air fryer, and the added overturn assembly expands the function of the oven.

The heating assembly, the hot air circulation system and the overturn assembly are reasonably combined, which effectively takes into account the functional advantages of the three, thereby meeting the different needs of users, improving user experience, and effectively saving kitchen space.

BRIEF DESCRIPTION OF THE DRAWINGS

In order to more clearly illustrate the technical solutions in the embodiments of the present disclosure or in the prior art, the following briefly introduces the accompanying drawings that need to be used in the description of the embodiments or the prior art. Obviously, the drawings in the following description are only some embodiments of the present disclosure. For those of ordinary skill in the art, other drawings can also be obtained based on the structures shown in these drawings without any creative effort.

Figure 1:
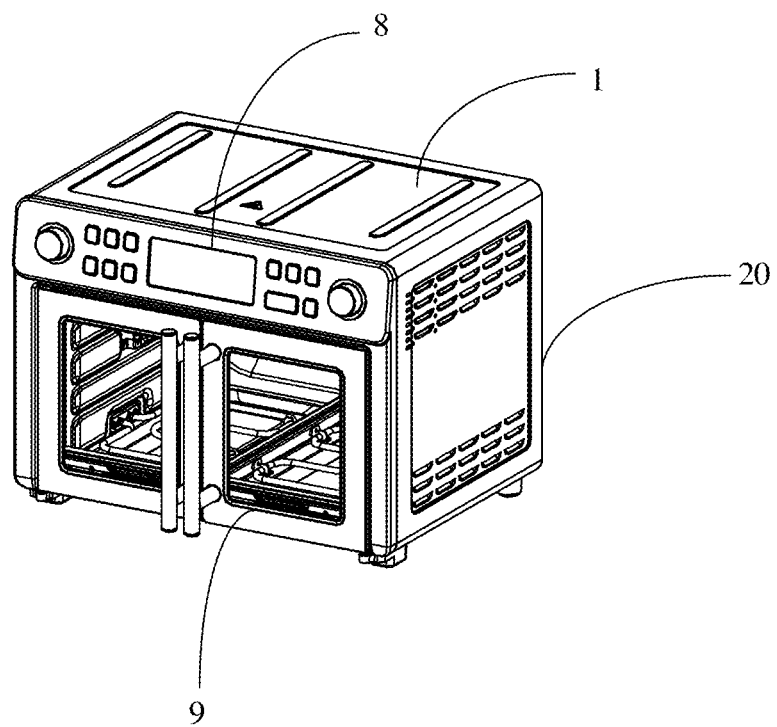
FIG. 1 is a schematic structural view of a multi-chamber oven according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions in the embodiments of the present disclosure will be clearly and completely described below with reference to the accompanying drawings of the present disclosure. Obviously, the described embodiments are only a part of the embodiments of the present disclosure, but not all of the embodiments. Based on the embodiments in the present disclosure, all other embodiments obtained by those of ordinary skill in the art without creative work fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

In the present disclosure, unless otherwise clearly specified and limited, the terms "connected", "fixed", etc. should be interpreted broadly. For example, "fixed" can be a fixed connection, a detachable connection, or a whole; can be a mechanical connection or an electrical connection; may be directly connected, or indirectly connected through an intermediate medium, and may be the internal communication between two elements or the interaction relationship between two elements, unless specifically defined otherwise. For those of ordinary skill in the art, the specific meaning of the above-mentioned terms in the present disclosure can be understood according to specific circumstances.

It should be noted that, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

The present disclosure provides a multi-chamber oven, which aims to expand the function of the air fryer by adding a hot air circulation system, and expand the function of the oven by adding an overturn assembly. The heating assembly, the hot air circulation system and the overturn assembly are reasonably combined, which effectively takes into account the functional advantages of the three, thereby meeting the different needs of users, improving user experience, and effectively saving kitchen space.

As shown in FIG. 1 to FIG. 12, the specific structure of a multi-chamber oven 20 is described. In an embodiment of the present disclosure, the multi-chamber oven 20 includes a box body 1, a baffle assembly 2, a heating assembly 3, a hot air circulation system 4 and an overturn assembly 5. The box body 1 includes an outer shell 11 and an inner shell 12 connected to the outer shell 11, the outer shell 11 is enclosed with the inner shell 12 to form a storage cavity 16, the inner shell 12 is formed with an inner cavity 13, and the storage cavity 16 is communicated with the inner cavity 13. The baffle assembly 2 is movably mounted in the inner cavity 13 to divide the inner cavity 13 into a first cavity 14 and a second cavity 15. The heating assembly 3 is provided on a cavity wall of the first cavity 14 and a cavity wall of the second cavity 15, to bake a food material placed in the first cavity 14 and the second cavity 15. The hot air circulation system 4 is provided in the storage cavity 16 and communicated with the first cavity 14 and the second cavity 15, to bake the food material placed in the first cavity 14 and the second cavity 15. The overturn assembly 5 is movably provided on a side wall of the inner cavity 13 to drive the food material in the inner cavity 13 to turn over, to make the heating assembly 3 and the hot air circulation system 4 bake the turned food material. The inner cavity 13 is divided into the first cavity 14 and the second cavity 15 through the baffle assembly 2. The heating assembly 3 and the hot air circulation system 4 can bake the food material in the first cavity 14 and the second cavity 15. The added hot air circulation system 4 expands the function of the air fryer, and the added overturn assembly 5 expands the function of the oven. The heating assembly 3, the hot air circulation system 4 and the overturn assembly 5 are reasonably combined, which effectively takes into account the functional advantages of the three, thereby meeting the different needs of users, improving user experience, and effectively saving kitchen space.

Figure 2:
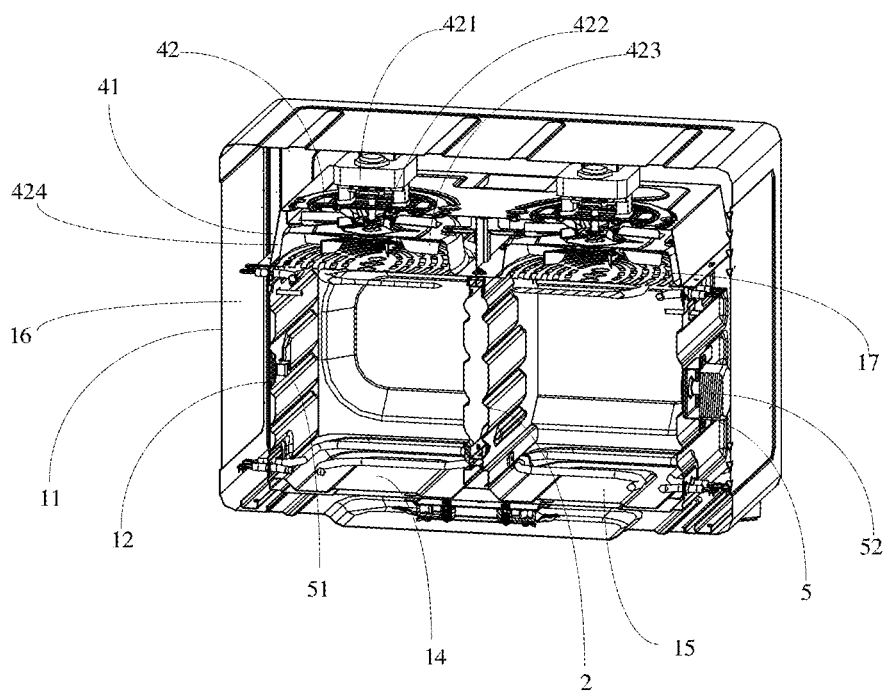
FIG. 2 is a three-dimensional cross-sectional view of the multi-chamber oven shown in FIG. 1.
Figure 5:
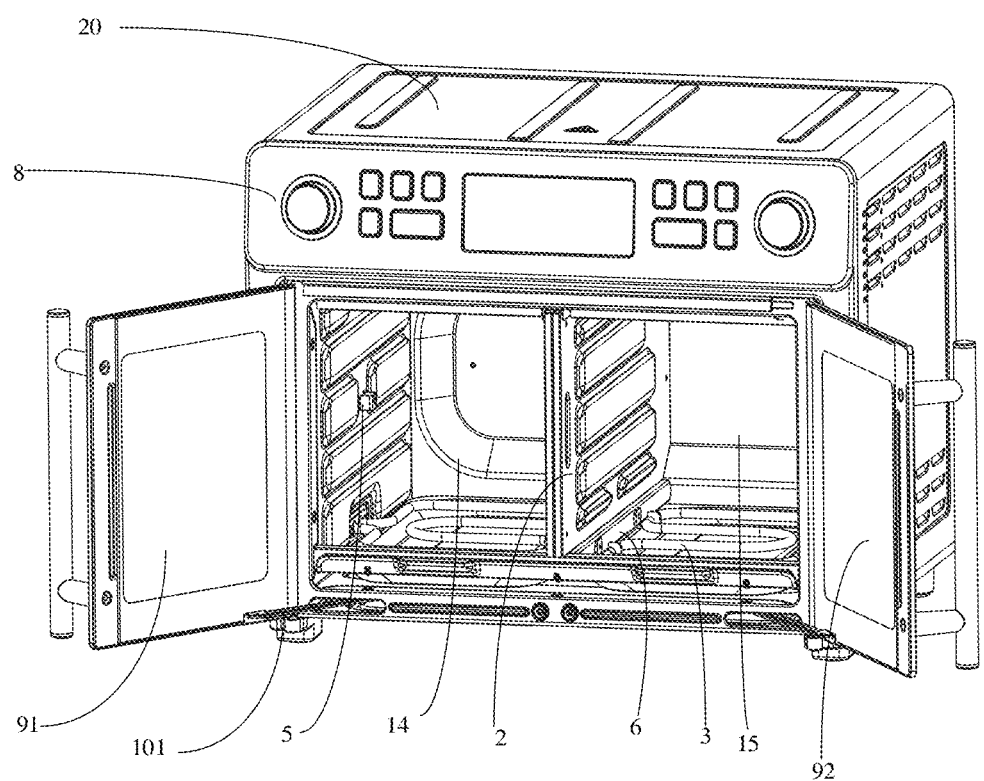
FIG. 5 is a schematic structural view of the multi-chamber oven in an open state shown in FIG. 1.
Figure 6:
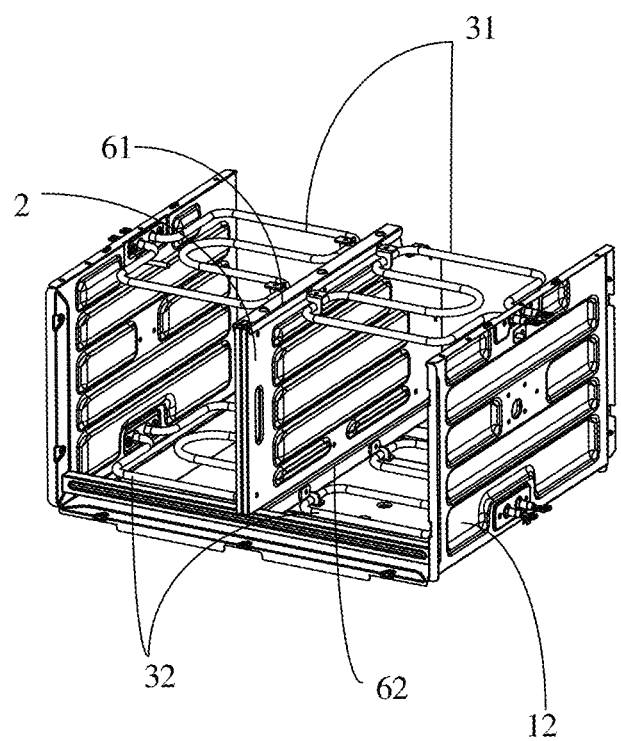
FIG. 6 is a schematic structural view of an inner shell of the multi-chamber oven shown in FIG. 1.
Figure 13:
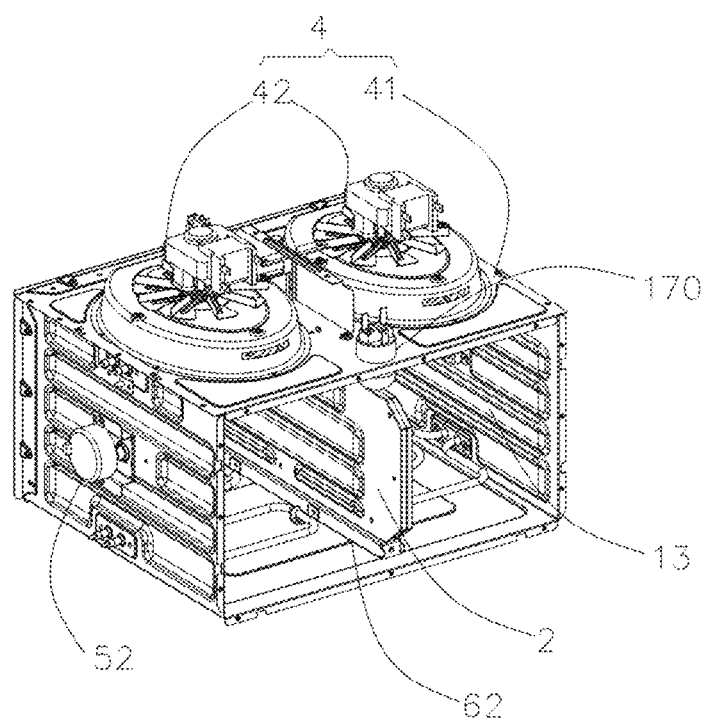
FIG. 13 is an internal schematic structural view of the multi-chamber oven shown in FIG. 1 from another perspective.

As shown in FIG. 2, FIG. 5 and FIG. 13, the inner shell 12 includes a top plate 17. A furnace lamp 170 is mounted on a surface of the top plate 17 facing the inner cavity 13. A groove 21 is formed at an end of the baffle assembly 2 close to the furnace lamp 170. The furnace lamp 170 is clamped in the groove 21, to make the furnace lamp 170 illuminate the first cavity 14 and the second cavity 15 simultaneously. By setting one furnace lamp 170 to illuminate the first cavity 14 and the second cavity 15 simultaneously, so that the multi-chamber oven 20 is in the dual-chamber working mode, the lighting effect of the furnace lamp 170 can be shared.

In order to further ensure the cooperation between the furnace lamp 170 and the baffle assembly 2, the shape of the groove 21 is adapted to the shape of the furnace lamp 170, such that the furnace lamp 170 can simultaneously illuminate the first cavity 14 and the second cavity 15. The specific shapes of the furnace lamp 170 and the groove 21 are not limited herein, and it is only necessary to ensure that the shape of the furnace lamp 170 matches the shape of the groove 21. The baffle assembly 2 is provided in the inner cavity 13 to divide the inner cavity 13 into a first cavity 14 and a second cavity 15, which is convenient for the user to adjust the temperature and time of the first cavity 14 and the second cavity 15 in real time respectively according to the actual needs of the processed food, to ensure a variety of choices of processed food. Each chamber can be fully baked by the heating assembly, so as to ensure that the processed food is heated evenly, and has a uniform color and crispness, so that the cooked food tastes better and the user experience is improved.

Figure 3:
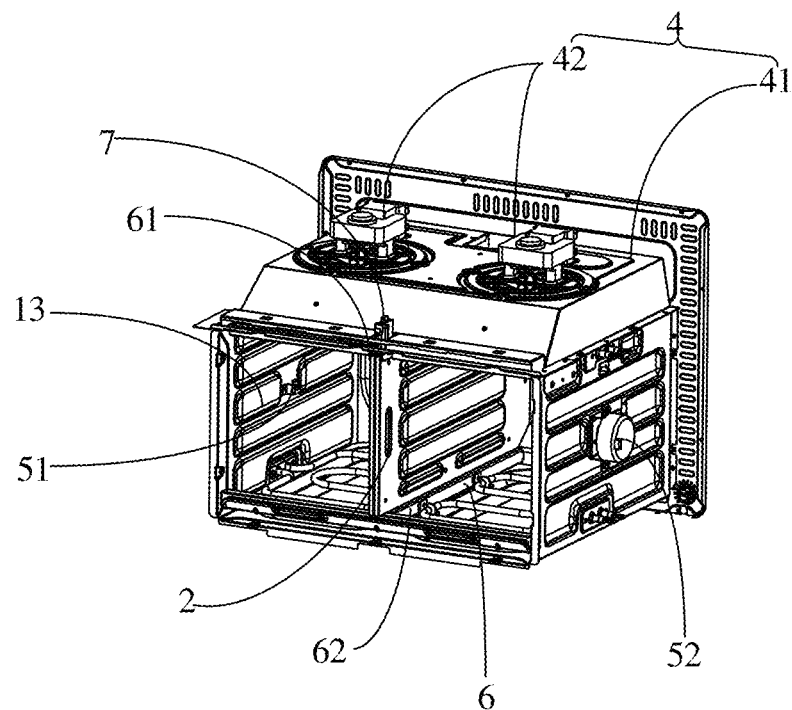
FIG. 3 is an internal schematic structural view of the multi-chamber oven shown in FIG. 1.
Figure 4:
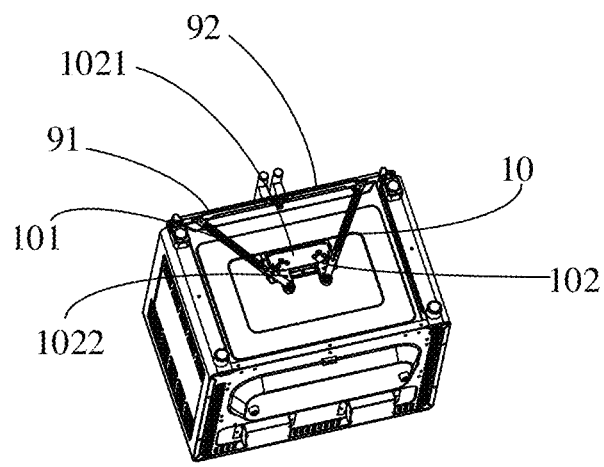
FIG. 4 is a bottom view of the multi-chamber oven shown in FIG. 1.
Figure 7:
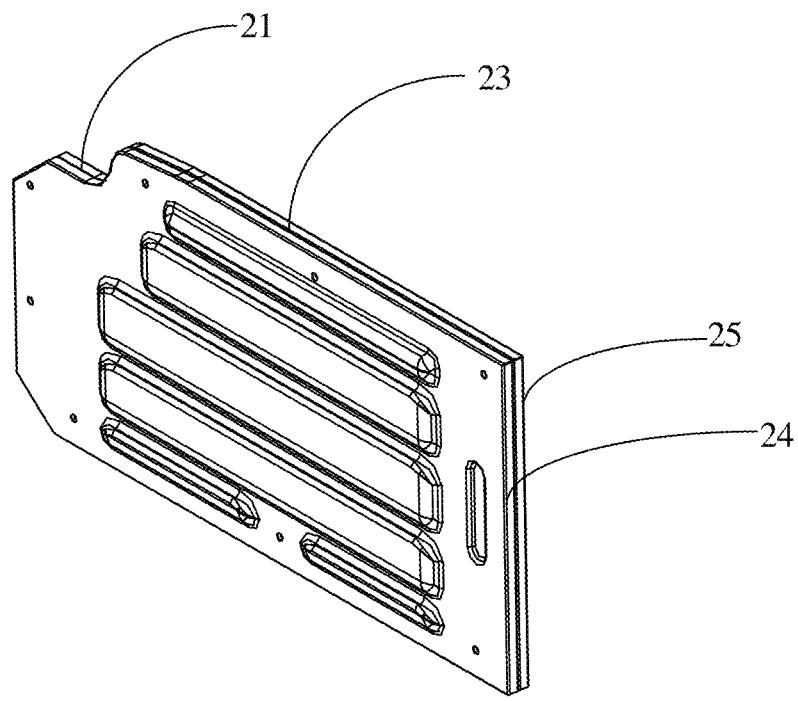
FIG. 7 is a schematic structural view of a first thermal insulation plate and a second thermal insulation plate of a baffle assembly shown in FIG. 5.
Figure 8:
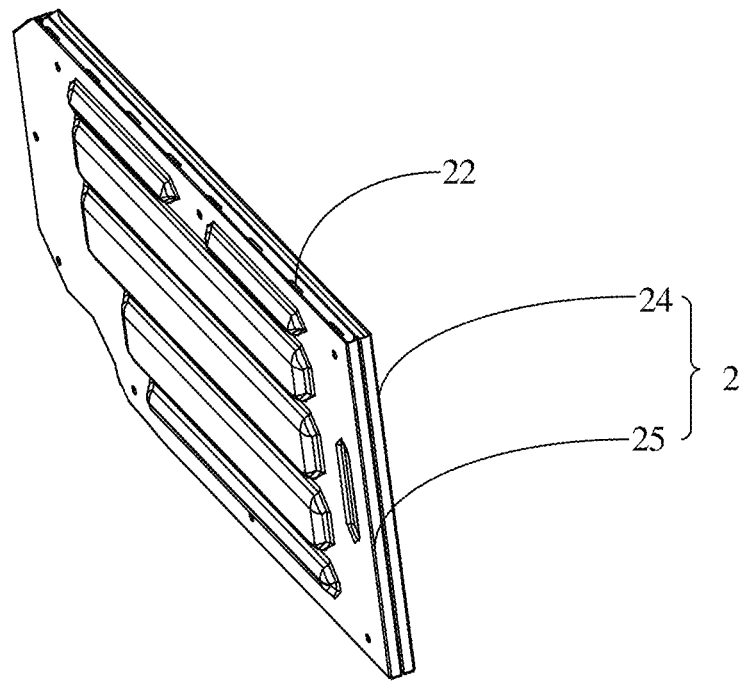
FIG. 8 is a schematic structural view of the first thermal insulation plate and the second thermal insulation plate of the baffle assembly shown in FIG. 7 from another perspective.
Figure 9:
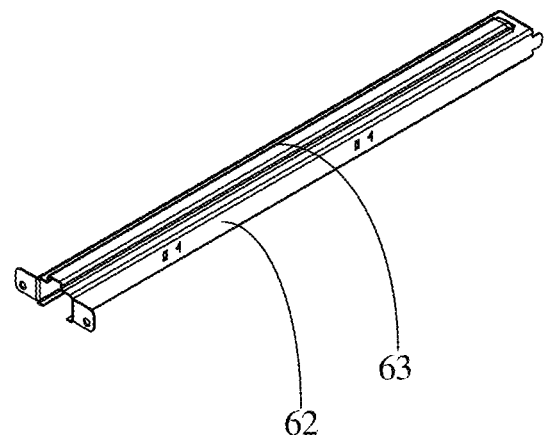
FIG. 9 is a schematic structural view of a second guide rail in a guide rail assembly shown in FIG. 5.
Figure 10:
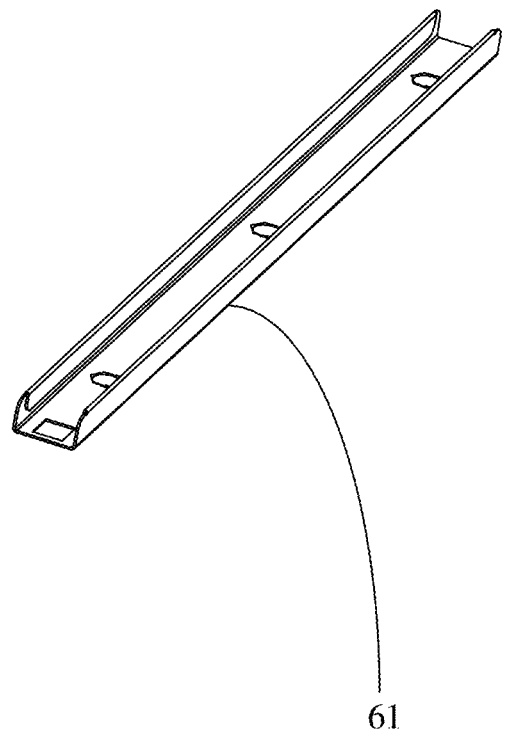
FIG. 10 is a schematic structural view of a first guide rail in the guide rail assembly shown in FIG. 5.

As shown in FIG. 3, FIG. 7 and FIG. 8, a bottom wall of the inner cavity 13 is connected to a guide rail assembly 6. The guide rail assembly 6 includes a first guide rail 61 and a second guide rail 62, the first guide rail 61 is mounted on the top plate 17, and the second guide rail 62 is provided on the bottom wall of the inner cavity 13. By arranging the first guide rail 61 and the second guide rail 62, it is convenient for the baffle assembly 2 to be fixedly mounted in the inner cavity 13, and it is also convenient for the user to take out the baffle assembly 2 from the inner cavity 13.

An insertion groove 22 is formed on one side of the baffle assembly, another side of the baffle assembly is an abutting end 23, and the abutting end 23 is communicated with the groove 21. The first guide rail 61 is U-shaped, and is slidably matched with the abutting end 23. The second guide rail 62 is formed with a protrusion 63 on a surface facing the baffle assembly 2, and the protrusion 63 is slidably matched with the insertion groove 22, to make the baffle assembly 2 be slidably provided on the guide rail assembly 6. The baffle assembly can be taken out or put in from the guide rail assembly 6. It should be noted that the junction between the baffle assembly and the guide rail assembly 6 is still closely arranged. Thus, the volume change of the inner cavity 13 and the temperature of the first cavity 14 and the second cavity 15 do not affect each other, and the first cavity 14 and the second cavity 15 can cook different food materials at different temperatures at the same time.

Figure 11:
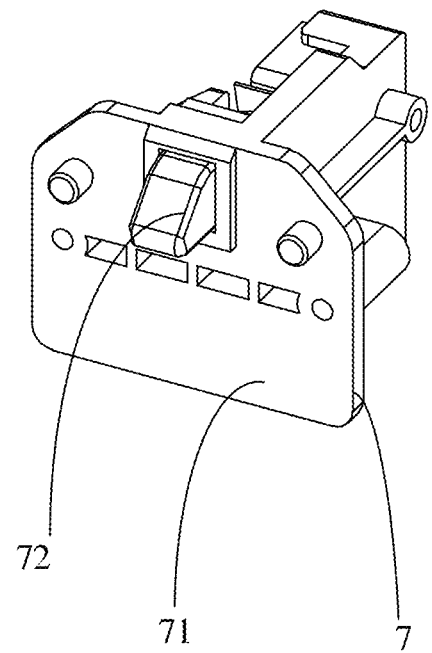
FIG. 11 is a schematic structural view of a micro switch assembly of the multi-chamber oven shown in FIG. 1.

As shown in FIG. 3 and FIG. 11, the multi-chamber oven 20 further includes a micro switch assembly 7. The micro switch assembly 7 includes a mounting seat 71 and a micro switch 72 provided on the mounting seat 71. The mounting seat 71 is mounted on a top wall of the inner cavity 13 and is located at one side of the first guide rail 61. The first guide rail 61 is provided with a through hole for the micro switch 72 to pass through, to make the micro switch 72 sense the installation of the baffle assembly 2. The multi-chamber oven 20 further includes a control panel 8 mounted in the storage cavity 16. The control panel 8 is located at one side of an opening of the inner cavity 13, and the micro switch 72 is electrically connected to the control panel 8. The micro switch assembly 7 can sense that the baffle assembly 2 enters the inner cavity 13 or is taken out from the inner cavity 13, which is convenient to turn on the different working modes of the oven, so as to realize the roasting of food in various ways.

The micro switch 72 is mounted on the top wall of the inner cavity 13 through the mounting seat 71, so that the baffle assembly 2 of the inner cavity 13 can be entered through the guide rail assembly 6. The micro switch 72 can sense the entry or removal of the baffle assembly 2. The micro switch 72 is electrically connected to the control panel 8. When the baffle assembly 2 enters the inner cavity 13, under the action of the micro switch 72, the multi-chamber oven 20 enters the dual-chamber working mode, which is convenient for baking different food materials at different temperatures. When the baffle assembly 2 is taken out from the inner cavity 13, the multi-chamber oven 20 enters the single-chamber working mode, and at this time, food with a relatively large volume can be baked.

Figure 12:
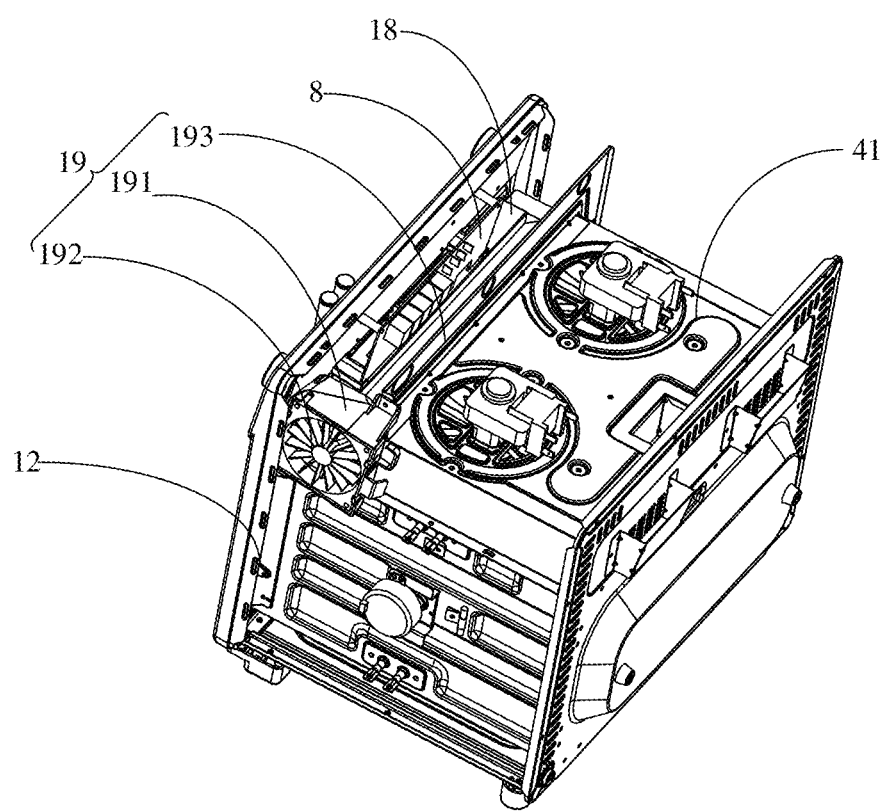
FIG. 12 is a schematic structural view of a cooling assembly of the multi-chamber oven shown in FIG. 1.

As shown in FIG. 3 and FIG. 12, the storage cavity 16 is provided with a pressing plate 18, and the pressing plate 18 is provided on a side of the control panel 8 facing the storage cavity 16. The pressing plate 18 is provided with thermal insulation cotton, and the thermal insulation cotton is configured to insulate heat of the inner cavity 13. The control panel 8 can be prevented from being affected by the hot air in the inner cavity 13, which can cause the control panel 8 to be damaged due to overheating, prolong its service life, and help prolong the service life and ensure safe use.

The baffle assembly includes a first thermal insulation plate 24 and a second thermal insulation plate 25 that are attached and connected to each other. In order to further ensure a stable connection between the first thermal insulation plate 24 and the second thermal insulation plate 25, a bracket is mounted between the first thermal insulation plate 24 and the second thermal insulation plate 25, so that the installation of the first thermal insulation plate 24 and the second thermal insulation plate 25 is more stable, and the first thermal insulation plate 24 and the second thermal insulation plate 25 are not easy to separate. The first thermal insulation plate 24 and the second thermal insulation plate 25 can also be fixed by means of screw connection, welding or bonding, or other fixing methods. The present disclosure is not limited herein, and it is only necessary to ensure the fit connection between the first thermal insulation plate 24 and the second thermal insulation plate 25.

As shown in FIG. 3, the overturn assembly 5 includes a swivel fork bracket 51, a first drive member 52 and a swivel fork shaft. The swivel fork bracket 51 is mounted on an inner side wall of the inner cavity. The first drive member 52 is mounted on an outer side wall of the inner cavity 13 and located in the storage cavity 16. One end of the swivel fork shaft is movably mounted on the swivel fork bracket 51, and the other end of the swivel fork shaft is connected to an output end of the first drive member 52, to make the first drive member 52 drive the swivel fork shaft to rotate. The swivel fork bracket 51 and the first drive member 52 are configured to drive the swivel fork shaft to rotate, which is convenient to rotate the baked food. The first drive member 52 can reduce the influence of the hot air in the inner cavity 13 on the first drive member 52, which may prolong its service life, prevent the first drive member 52 from being damaged due to overheating, and help prolong the service life and ensure safe use. It should be noted that, the first drive member 52 may be a drive motor, or may be other driving methods, which are not limited herein in the present disclosure.

One end of the swivel fork shaft is movably mounted on the swivel fork bracket 51, and another end of the swivel fork shaft is movably connected to the first drive member 52. The connection between the swivel fork shaft and the swivel fork bracket 51 can be a snap connection, a screw connection or other detachable connection methods, such that the swivel fork shaft is detachably connected to the swivel fork bracket 51. Similarly, the swivel fork shaft is also detachably connected to the first drive member 52, which is not limited in the present disclosure.

In an embodiment, when the food needs to be rotated and roasted, the baffle assembly 2 is taken out from the inner cavity 13. As a result, the inner cavity 13 is no longer divided into the first cavity 14 and the second cavity 15 by the baffle assembly 2. At this time, it is only necessary to install the food on the swivel fork shaft, and install the swivel fork shaft on the swivel fork bracket 51 and the first drive member 52 successively. The food is rotated under the driving of the first drive member 52 so that the heating assembly 3 and the hot air assembly 42 bake the food.

As shown in FIG. 2 and FIG. 3, the top plate 17 is provided with a ventilation hole. The hot air circulation system 4 includes an outer cover 41 and two spaced apart hot air assemblies 42 provided on the outer cover 41. The outer cover 41 is mounted on the top plate 17, the two hot air assemblies 42 are located above the ventilation hole, and the two hot air assemblies 42 are communicated with the inner cavity 13 through the top plate 17. The heating assembly 3 includes two first heating elements 31 opposite to each other, one of the two hot air assemblies 42 is provided on a side of one of the two first heating elements 31, another one of the two hot air assemblies 42 is provided on a side of another one of the two first heating elements 31. The hot air assembly 42 is provided above the ventilation hole, and the ventilation hole is communicated with the inner cavity 13. That is, through the operation of the hot air assembly 42, the air flow generated by the hot air assembly 42 enters the inner cavity 13 through the ventilation holes, and passes through the first heating element 31 that generates heat, thereby forming hot air. When the hot air is blown to the food at a high speed, it can quickly take away the moisture on the food, so as to achieve the effect of frying, and then realize the working effect of the air fryer. The heating assembly 3 further includes two second heating elements 32 opposite to each other, and the second heating element 32 is provided on a side of the first heating element 31 away from the hot air assembly 42. When the hot air assembly 42 is turned off, the first heating element 31 and the second heating element 32 can also be used to realize the function of the oven, thereby realizing the dual functions of the air fryer and the oven.

It should be noted that both the first heating element 31 and the second heating element 32 are Negative Temperature Coefficient (NTC) temperature control heating pipes. Through the setting of the NTC temperature control heating tube, the temperature of the two cavities can be controlled respectively, which is convenient for heating the food materials placed in the first cavity 14 and the second cavity 15.

As shown in FIG. 2, the hot air assembly 42 includes a second drive member 421, a cooling blade 422, a convection blade 423, and an inner cover 424 provided between the cooling blade 422 and the convection blade 423. The second drive member 421 includes a drive motor and an output shaft provided at an output end of the drive motor. Both the cooling blade and 422 the convection blade 423 are sleeved on the output shaft, the convection blade 423 is provided on a side close to the ventilation hole, and the cooling blade 422 is provided on a side of the convection blade 423 away from the ventilation hole. The inner cover 424 is fixedly connected to the top plate 17, the convection blade 423 is provided in the inner cover 424, the outer cover 41 is wrapped around an outer periphery of the inner cover 424, and a cooling air duct is formed between the outer cover 41 and the inner cover 424.

The second drive member 421 drives the convection blade to rotate so that the air in the box body 1 circulates to fry the food. The motor also drives the cooling blade 422 to rotate, and the heat is conducted upward through the top plate 17 to exchange heat with the air in the cooling air duct. In an embodiment, the rotation directions of the two second drive members 421 can be set to be opposite. When the baffle assembly 2 is mounted in the inner cavity 13, each second drive member 421 can play the role of heat dissipation for the respective cavity. Since the rotation direction of the first control motor is opposite to the rotation direction of the second control motor, the rotation direction of the convection blade 423 controlled by the first control motor is opposite to the rotation direction of the cooling blade 422 controlled by the second control motor. Therefore, when the cooling blade 422 is rotating, the cooling blade 422 will dissipate the heat between the first heat insulation plate 24 and the second heat insulation plate 25. In this way, the baffle assembly 2 forms an effective heat insulation barrier, which can better avoid the situation of temperature intercommunication and avoid the influence of cross temperature. After the baffle assembly 2 is taken away, the reverse rotation of the two second drive members 421 will also make the temperature in the inner cavity 13 more uniform, so that the food in the inner cavity 13 can be cooked more uniformly.

It should be noted that the second drive member 421 may be a drive motor, or may be other driving methods, which are not limited herein in the present disclosure.

As shown in FIG. 2, the box body further includes a plurality of air inlet holes and air exhaust passages, and the plurality of air inlet holes are provided on an outer wall of the outer shell and communicated with the storage cavity. A side wall of the inner cover is provided with the ventilation hole, the cooling air duct is communicated with the ventilation hole, and the air exhaust passage is fixedly mounted on the outer wall of the outer shell and communicated with the cooling air duct. The air exhaust passage is provided on the box body 1, which can quickly dissipate heat to the box body 1. A plurality of air inlet holes are provided on the outer wall of the outer shell 11 and communicated with the storage cavity 16. The outside air can be driven by the cooling blade 422 through the air inlet hole to enter the cooling air duct through the storage cavity 16 and the outer cover 41 in turn for heat exchange.

As shown in FIG. 12, the pressing plate and the thermal insulation cotton are configured to isolate the heat in the inner cavity 13, which can prevent the control panel 8 from being affected by the hot air in the inner cavity 13, and a cooling assembly is also provided in the storage cavity to further dissipate the control panel. The storage cavity 16 is also provided with a cooling assembly 19, the cooling assembly 19 includes a fan base 191 and a cooling fan 192 provided on the fan base 191, the fan base 192 is mounted on a side of the control panel 8 and communicated with the air inlet hole. The cooling assembly 19 further includes an air duct baffle 193, the air duct baffle 193 is provided on a side of the outer cover 41 close to the control panel 8, and on a side of the air outlet of the cooling fan 192, so that the air flow blown by the cooling fan 192 is concentrated on the control panel 8. The outside air is driven by the cooling fan 192 to further dissipate heat on the control panel 8, At the same time, the air duct baffle 193 is also provided to further concentrate the air flow, so that it can better concentrate on the control panel 8, and the air flow can be exhausted from the air inlet holes on the other side of the outer shell 11, thereby effectively preventing the control panel 8 from being damaged due to overheating, which helps to prolong the service life of the control panel and ensure safe use.

As shown in FIG. 5, the multi-chamber oven 20 further includes a door assembly 9, and a connecting rod assembly 10. The connecting rod assembly 10 is provided on a bottom wall of the inner cavity 13, to make the connecting rod assembly 10 drive the door assembly 9 to open at an angle. The door assembly 9 includes a first glass door 91 and a second glass door 92. The connecting rod assembly 10 includes two switch frames 101 and a connecting piece 102 that drives the two switch frames 101 to rotate. One ends of the two switch frames 101 are respectively provided on inner surfaces of the first glass door 91 and the second glass door 92, and the other ends of the two switch frames 101 are rotatably connected to the connecting piece 102. The connecting piece 102 includes a fixed base 1021 and two sliding blocks 1022 rotatably connected to the fixed base 1021, and the two switch frames 101 are rotatably connected to one end of the two sliding blocks 1022 away from the fixed base 1021. By arranging the connecting rod assembly 10, it is convenient for the first glass door 91 and the second glass door 92 to be fully opened, so that the food can enter and exit the inner cavity 13 smoothly.

In order to make the maximum opening angle of the first glass door 91 and the second glass door 92 to be 125 degrees, the switch frame 101 and the connecting rod assembly 10 are provided. The connecting rod assembly 10 includes a fixed base 1021 and two sliding blocks 1022 provided on the fixed base 1021, and the two switch frames 101 are connected to the two sliding blocks 1022 in sequence. When the sliding block 1022 rotates on the fixed base 1021, the fixed base 1021 plays the role of limiting and positioning. The other ends of the two switch frames 101 are respectively connected to the first glass door 91 and the second glass door 92. The first glass door 91 and the second glass door 92 are opened to the maximum extent, so that the first glass door 91 and the second glass door 92 can be fully opened, so that food can enter and exit the inner cavity 13 smoothly.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A multi-chamber oven, comprising:
a box body comprising an outer shell and an inner shell connected to the outer shell, wherein the outer shell is enclosed with the inner shell to form a storage cavity, the inner shell is formed with an inner cavity, and the storage cavity is communicated with the inner cavity;

a baffle assembly movably mounted in the inner cavity to divide the inner cavity into a first cavity and a second cavity;

a heating assembly provided on a cavity wall of the first cavity and a cavity wall of the second cavity, to bake a food material placed in the first cavity and the second cavity;

a hot air circulation system provided in the storage cavity and communicated with the first cavity and the second cavity, to bake the food material placed in the first cavity and the second cavity; and an overturn assembly movably provided on a side wall of the inner cavity to drive the food material in the inner cavity to turn over, to make the heating assembly and the hot air circulation system bake the turned food material;

wherein the inner shell comprises a top plate, a furnace lamp is mounted on a surface of the top plate facing the inner cavity, a groove is formed at an end of the baffle assembly close to the furnace lamp, the furnace lamp is clamped in the groove, and the groove enables the furnace lamp illuminate the first cavity and the second cavity simultaneously.

2. The multi-chamber oven of claim 1, further comprising:

a guide rail assembly, wherein the guide rail assembly comprises a first guide rail and a second guide rail, the first guide rail is mounted on the top plate, and the second guide rail is provided on the bottom wall of the inner cavity;

an insertion groove is formed on one side of the baffle assembly, another side of the baffle assembly is an abutting end, and the abutting end is communicated with the groove; and the first guide rail is U-shaped, and is slidably matched with the abutting end, the second guide rail is formed with a protrusion on a surface facing the baffle assembly, and the protrusion is slidably matched with the insertion groove, to make the baffle assembly be slidably provided on the guide rail assembly.

3. The multi-chamber oven of claim 2, further comprising:

a micro switch assembly comprising a mounting seat and a micro switch provided on the mounting seat; and a control panel mounted in the storage cavity, wherein:

the mounting seat is mounted on a top wall of the inner cavity and is located at one side of the first guide rail;

the first guide rail is provided with a through hole for the micro switch to pass through, to make the micro switch sense the installation of the baffle assembly; and the control panel is located at one side of an opening of the inner cavity, and the micro switch is electrically connected to the control panel.

4. The multi-chamber oven of claim 3, wherein:

the storage cavity is provided with a pressing plate, and the pressing plate is provided on a side of the control panel facing the storage cavity;

the pressing plate is provided with a thermal insulation cotton, and the thermal insulation cotton is configured to insulate heat of the inner cavity; and/or the baffle assembly comprises a first thermal insulation plate and a second thermal insulation plate that are attached and connected to each other.

5. The multi-chamber oven of claim 3, wherein the top plate is provided with a ventilation hole, the hot air circulation system comprises an outer cover and two spaced apart hot air assemblies provided on the outer cover, the outer cover is mounted on the top plate, the two hot air assemblies are located above the ventilation hole, and the two hot air assemblies are communicated with the inner cavity through the top plate.

6. The multi-chamber oven of claim 1, wherein the overturn assembly comprises:

a swivel fork bracket mounted on an inner side wall of the inner cavity;

a first drive member mounted on an outer side wall of the inner cavity and located in the storage cavity; and a swivel fork shaft, wherein one end of the swivel fork shaft is movably mounted on the swivel fork bracket, and the other end of the swivel fork shaft is connected to an output end of the first drive member, to make the first drive member drive the swivel fork shaft to rotate.

7. The multi-chamber oven of claim 6, wherein:

each hot air assembly comprises a second drive member, a cooling blade, a convection blade, and an inner cover provided between the cooling blade and the convection blade;

the second drive member comprises a drive motor and an output shaft provided at an output end of the drive motor, both the cooling blade and the convection blade are sleeved on the output shaft, the convection blade is provided on a side close to the ventilation hole, and the cooling blade is provided on a side of the convection blade away from the ventilation hole;

the inner cover is fixedly connected to the top plate, the convection blade is provided in the inner cover, the outer cover is wrapped around an outer periphery of the inner cover, and a cooling air duct is formed between the outer cover and the inner cover;

the heating assembly comprises two first heating elements opposite to each other, one of the two hot air assemblies is provided on a side of one of the two first heating elements, another one of the two hot air assemblies is provided on a side of another one of the two first heating elements; and the heating assembly further comprises two second heating elements opposite to each other, and the second heating element is provided on a side of the first heating element away from the hot air assembly.

8. The multi-chamber oven of claim 7, wherein:

the box body further comprises a plurality of air inlet holes and air exhaust passages, and the plurality of air inlet holes are provided on an outer wall of the outer shell and communicated with the storage cavity;

a side wall of the inner cover is provided with the ventilation hole, the cooling air duct is communicated with the ventilation hole, and the air exhaust passage is fixedly mounted on the outer wall of the outer shell and communicated with the cooling air duct;

the storage cavity is also provided with a cooling assembly, the cooling assembly comprises a fan base and a cooling fan provided on the fan base, the fan base is mounted on a side of the control panel and communicated with the air inlet hole; and the cooling assembly further comprises an air duct baffle, the air duct baffle is provided on a side of the outer cover close to the control panel, and on a side of the air outlet of the cooling fan, so that the air flow blown by the cooling fan is concentrated on the control panel.

9. The multi-chamber oven of claim 1, further comprising:
- a door assembly; and
- a connecting rod assembly, wherein:
- the connecting rod assembly is provided on a bottom wall of the inner cavity, to make the connecting rod assembly drive the door assembly to open at an angle;
- the door assembly comprises a first glass door and a second glass door;
- the connecting rod assembly comprises two switch frames and a connecting piece that drives the two switch frames to rotate;
- one ends of the two switch frames are respectively provided on inner surfaces of the first glass door and the second glass door, and the other ends of the two switch frames are rotatably connected to the connecting piece; and
- the connecting piece comprises a fixed base and two sliding blocks rotatably connected to the fixed base, and the two switch frames are rotatably connected to one end of the two sliding blocks away from the fixed base.

* * * * *